May 22, 1923. 1,455,820

K. STAHL

CONTROLLING DEVICE FOR AERIAL VEHICLES

Filed June 28, 1920

INVENTOR:

Patented May 22, 1923.

1,455,820

UNITED STATES PATENT OFFICE.

KARL STAHL, OF FRIEDRICHSHAFEN, GERMANY, ASSIGNOR TO THE FIRM LUFT-SCHIFFBAU ZEPPELIN GESELLSCHAFT MIT BESCHRÄNKTER HAFTUNG, OF FRIEDRICHSHAFEN, GERMANY, A CORPORATION OF GERMANY.

CONTROLLING DEVICE FOR AERIAL VEHICLES.

Application filed June 28, 1920. Serial No. 392,601.

*To all whom it may concern:*

Be it known that I, KARL STAHL, a citizen of the German Empire, residing at Friedrichshafen a/B., Germany, have invented certain new and useful Improvements in Controlling Devices for Aerial Vehicles (for which I have filed application in Germany, February 11, 1918), of which the following is a specification.

My invention refers to controlling devices and more especially to such, which especially in air-craft, allow of bringing into action at a predetermined time several individuals or larger or smaller groups or the whole of a plurality of congenerous arrangements. More particularly does the invention refer to controlling devices for operating the gas valves of air-ships in groups.

An air-ship may possess many gas-cells independent of each other, the valves of which can be operated by traction ropes from an operator's stand common to said ropes. If only one or the other valve need be pulled occasionally, the ordinary traction handles suffice. But often, for instance in the case of heavy bombs being dropped from different parts of the air-ship in quick succession, there arises the necessity of opening the escapes of the corresponding gas cells in order to restore the state of equilibrium of the air-ship again immediately. In such a case the commander is only able with great exertion of strength to pull the various valves in time, and sometimes even unable to do so.

The invention in the first place endeavours to do away with this drawback by creating a controlling device which makes it possible to operate simultaneously any desired valves singly or united in groups. Accordingly the object of the invention consists in a controlling device for air-ships especially suited for operating gas-valves, in which the elements to be operated are connected with a joint controlling stand not only by individual traction ropes, but also by group traction ropes. The connection according to the invention is such a one that the individual traction-rope groups can temporarily and independently of one another be coupled to a joint releasing device.

A particularly advantageous controlling device is obtained by arranging on a common driving-shaft several coupling sleeves which turn loosely on the shaft, but can be coupled with the driving shaft according to choice by gearing in clutches. According to the invention a joint auxiliary traction rope connects every one of these sleeves with several individual traction ropes leading from the valves to the controlling device, just above the loose ends. The number of valves united in one group through the joint auxiliary traction rope is in itself a matter of choice. It is, however, advisable to unite only the valves of two gas cells which are close to each other in the air-ship in a group to be connected to the same sleeve. In this way as many auxiliary traction rope and valve groups respectively and sleeves are obtained as the air-ship possesses gas cells.

In order to be able to put into operation the various groups of valves without loss of time and for the purpose of rendering the controlling device more perspicuous, an auxiliary spring-loaded lever is provided between each shiftable coupling part and the related controlling lever, the auxiliary spring-loaded lever calling forth the real coupling of the related sleeves with the driving shaft automatically under the influence of a spring, after being released by the controlling lever. The controlling levers as well as the handles of the individual traction ropes are arranged on the controlling device so as to correspond to the distribution of gas cells in the air-ship. Even with the great number of gas cells and escape valves respectively concerned in the case of a modern air-ship a commander can see at one glance in which parts of the craft the valves are pulled at the moment and in which not.

In the drawings attached to this specification and forming part thereof, a controlling device embodying my invention is illustrated by way of example in a purely diagrammatical manner.

Figure 1:
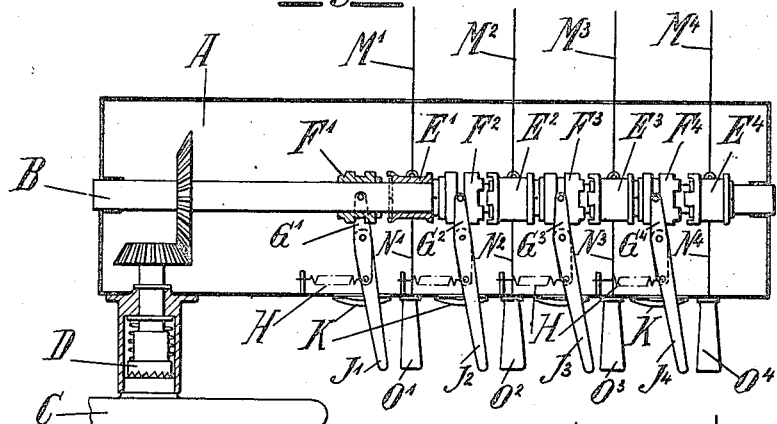
Fig. 1 is a longitudinal view of a controlling device for eight valves, a part of which is shown in section.
Figure 2:
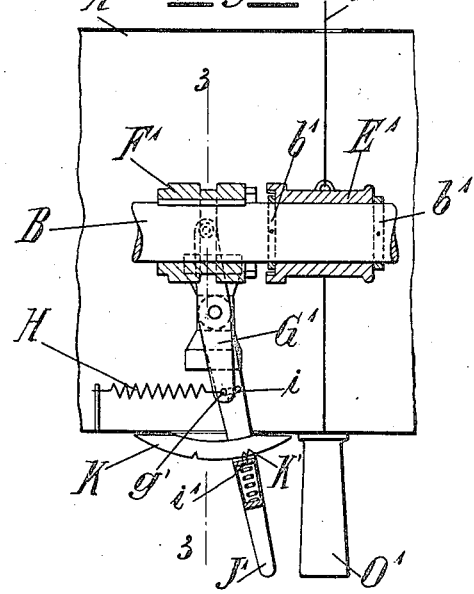
Fig. 2 is a partial section taken from Fig. 1 in an enlarged scale.
Figure 3:
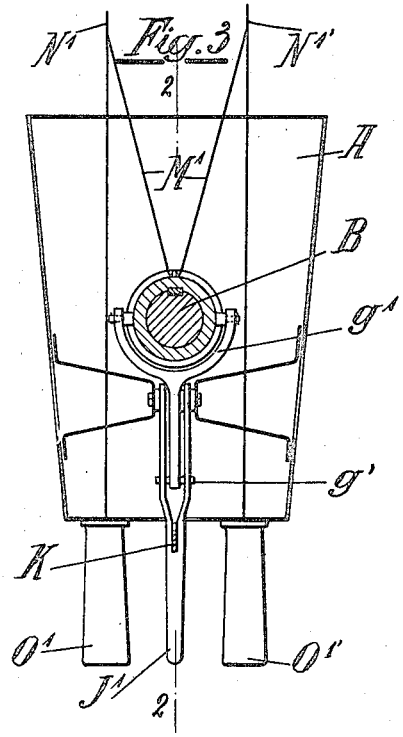
Fig. 3 is a cross-section in the plane 3—3 of Fig. 2.

In a casing A a driving shaft B fitted in bearings can be driven by means of a hand wheel C through the agency of a spring-loaded locking mechanism D acting in one direction only. The shaft B is fitted with four pairs of collars $b^1$, and with controlling sleeves $E'$—$E^4$ which are not shiftable endwise on the shaft, but can be rotated, and which are provided with clutch claws on one side. For each of the controlling sleeves one of four coupling sleeves $F'$—$F^4$ is provided non-rotatably, but shiftably on the driving-shaft. The coupling sleeves are guided by auxiliary levers $G'$—$G^4$ which grasp the related sleeves by means of a guiding fork $g^1$ each and endeavour to couple them with the corresponding controlling sleeves under the influence of tension springs. On the same axis as the auxiliary levers four oscillating controlling levers $J'$—$J^4$ which grasp the lower part of the related auxiliary levers in a fork-like manner, are fitted in the casing A, (cf. Fig. 3). By means of guiding pins $g^1$, of which one is provided in each auxiliary lever, and corresponding guiding slots $i$ in the controlling levers within limited bounds a reciprocal rotation of the controlling levers and auxiliary levers is made possible. Every controlling lever slides along a slide bar K and by means of a locking pawl $i^1$ arranged in its handle with a spring engages with a notch $k^1$ provided in the slide bar.

If for instance, the pawl of the controlling lever $J'$ is engaged with the notch $k^1$, the controlling lever occupies the extreme position in which the related coupling sleeve $F'$ is thrown out of gear and the corresponding controlling sleeve $E'$ can be freely rotated on the driving shaft B. The tension spring H is set, but cannot move the auxiliary lever $G'$ in the sense of throwing into gear the coupling sleeve $F'$ as the guide pin $g^1$ which rests against the left hand side of the guiding slot $i$, makes it impossible for the auxiliary lever $G'$ to perform a corresponding rotation in regard to the controlling lever $J'$. If the controlling lever $J'$ is now thrown over to the left and then left to itself, the auxiliary lever $G'$ under the influence of the spring H can also turn to the left and thereby throw into gear the coupling sleeve $F'$ with the controlling sleeve $E'$ as soon as both parts have reached a relative position which is favourable for the engaging of their respective clutch claws. The spring H then provides that the coupling remains intact. If the controlling lever $J'$ is now thrown over to the right again, the auxiliary lever $G'$ must on account of the guide pin $g^1$ and the guiding slot $i$ immediately follow this moment and throw off coupling sleeve $F'$ out of gear. As soon as the locking pawl $i^1$ snaps into the notch $k^1$ the original state is re-established. Each of the controlling sleeves $E'$—$E^4$ is connected by auxiliary traction ropes $M'$—$M^4$ with two of eight individual traction ropes $N^1$, $N^{1\prime}$—$N^{4\prime}$ which lead from four pairs of valves to the controlling device. As may be seen especially in Fig. 3, each auxiliary traction rope connects up with the individual traction ropes a certain distance from the loose ends. The latter end in handles $O^1$, $O^{1\prime}$—$O^{4\prime}$, so that they can also be operated singly. For technical reasons concerning the working of the plant, the valves of two gas cells following each other are arranged alternately on different sides of the central plane of the ship, but otherwise in pairs beside each other. The traction handles are also arranged correspondingly on both sides of the central plane of the controlling device, so that similarly to the controlling levers they offer a true picture of the distribution of cells in the air-ship.

The device is operated in the following manner: If, as an exceptional case only a single valve is to be opened, the corresponding traction rope handle is pulled down. If, however, for instance the foremost pair of valves comes into consideration, the controlling lever $J'$ corresponding to it, is thrown over to the left and the hand-wheel C turned in the opening direction. As soon as the pertinent pair of sleeves $E'$, $F'$ has reached the right mutual position for clutching, the coupling takes place as described above under the influence of the spring H. The controlling sleeve $E'$ then rotates with the shaft B and winds up the auxiliary traction rope $M'$. The effect is the same, as if the two single traction ropes $N^1$ and $N^{1\prime}$ were pulled simultaneously. If the pertinent valves are to be closed after some time, it is only necessary to return the controlling lever $J'$ to its "off" position and thus to release the controlling sleeve. As the gas escape valves have a powerful tension-spring load tending to close them, the unwinding of the auxiliary traction rope $M'$ takes place without further trouble. If, however, after the foremost pair of cells has blown off to a certain extent, the next succeeding pair shall blow off together for a short time with the foremost pair owing to a bomb having been dropped from the stern part of the air-ship, the hand-wheel C is first released. In consequence of the spring-load mentioned above the front valves close at once, and as a matter of fact much quicker than if it were attempted to turn back the hand-wheel. As soon as they are closed the hand-wheel runs on a little longer owing to its moment of inertia. But no winding up of the auxiliary traction rope $M'$ in the wrong direction takes place, as the spring-loaded locking mechanism throws the gear out. On the contrary the foremost valves remain closed for the time being. After having meanwhile thrown over the controlling lever $J^3$ the hand-wheel C can at once again be rotated in the direction opening the valves and after having automatically brought the pair of sleeves E³ F³ into gear opens the four valves corresponding to the single traction ropes N¹, N¹′, N³, N³′.

Particularly when coupling together several groups of valves the advantage is seen which is offered by the intermediate arrangement of spring-loaded auxiliary levers, which manage the real throwing-into-gear automatically. For then without any trouble, both hands are free to turn the hand-wheel against the strong force of the gas escape-valve springs. In spite of that the couplings are thrown into gear quickly and safely. If the driving-shaft is increased in size or several shafts which can be driven simultaneously are arranged beside one another, the individual valves can be connected up directly besides the pairs of valves, on the one hand and on the other hand groups can be formed for more than only two valves to be operated simultaneously by one controlling lever.

In the first place this controlling device is destined for the operation of gas valves in groups; but it can also be applied if it is a question of opening valves for discharging ballast casks or operating other appliances similar to each other in groups.

I claim:

1. In a controlling device for aircraft in combination, pairs of valves, a shaft and means for rotating said shaft, a plurality of winding drums loose on said shaft, each drum being adapted to control a pair of valves, a traction rope connected with each drum, means for coupling any number of drums with said shaft and means for controlling each valve separately.

2. In a controlling device for aircraft in combination, pairs of valves, a shaft and means for rotating said shaft, a plurality of winding drums loose on said shaft, a pair of traction ropes connected with each drum, independent means for coupling each drum with said shaft and means for pulling each rope separately.

3. In a controlling device for aircraft in combination, pairs of valves, a shaft and means for rotating said shaft, a plurality of winding drums loose on said shaft, a traction rope connected with each drum, a coupling sleeve near each drum secured against rotation on said shaft, a spring controlled lever operatively connected with each sleeve, a controlling lever for each spring controlled lever and having a common pivoted axis therewith and means for pulling each rope separately, said levers having a pin and slot connection.

In testimony whereof I affix my signature.

KARL STAHL.